United States Patent
Barnes et al.

[11] Patent Number: 6,120,813
[45] Date of Patent: Sep. 19, 2000

[54] WATER ICE PRODUCT AND PROCESS OF MANUFACTURE

[75] Inventors: Douglas James Barnes; Adrian Matthew Daniel; Vijay Arjun Sawant, all of Bedford, United Kingdom

[73] Assignee: Good Humor-Breyer's Ice Cream, division of Conopco, Inc., Green Bay, Wis.

[21] Appl. No.: 09/233,847

[22] Filed: Jan. 19, 1999

[30] Foreign Application Priority Data

Jan. 29, 1998 [GB] United Kingdom ............. 9801966

[51] Int. Cl.[7] ................................. F25C 1/00
[52] U.S. Cl. .................. 426/66; 426/585; 62/1; 62/66
[58] Field of Search ............ 426/66, 565; 62/1, 62/66

[56] References Cited

U.S. PATENT DOCUMENTS

| | | | |
|---|---|---|---|
| 3,256,100 | 6/1966 | Bernstein et al. | 99/136 |
| 3,845,231 | 10/1974 | Nagasawa et al. | 426/393 |
| 3,969,531 | 7/1976 | Cornelius | 426/319 |
| 4,219,581 | 8/1980 | Dea et al. | 426/565 |
| 4,826,656 | 5/1989 | Huber et al. | 426/565 |
| 5,112,626 | 5/1992 | Huang et al. | 426/43 |
| 5,660,866 | 8/1997 | Tomioka et al. | 426/100 |
| 5,698,247 | 12/1997 | Hall | 426/66 |
| 5,728,419 | 3/1998 | Caron et al. | 426/565 |
| 5,738,889 | 4/1998 | Bee | 426/66 |

FOREIGN PATENT DOCUMENTS

| | | |
|---|---|---|
| 537305 | 10/1931 | Germany . |
| 87 051 | 12/1972 | Germany . |
| 55-013708 | 4/1980 | Japan . |
| 915389 | 1/1963 | United Kingdom . |

*Primary Examiner*—Nina Bhat
*Attorney, Agent, or Firm*—James J. Farrell

[57] ABSTRACT

A water ice product is provided which is stable to processing and storage at −18° C., said product having a channelled porous structure having a gas phase volume of between 0.1 of 0.45 after hardening, wherein the water ice product comprises a stabiliser and not less than 0.1 wt % protein based aerating agent. Also provided is a process for preparation of the above water ice product, comprising the steps; (i) aeration of a water ice composition with an aerating gas which contains at least 50% by volume of a water soluble gas; (ii) freezing in a freezer such that the residence time in the freezer is approximately 2.5 to 10 minutes; and (iii) two-stage hardening.

16 Claims, 1 Drawing Sheet

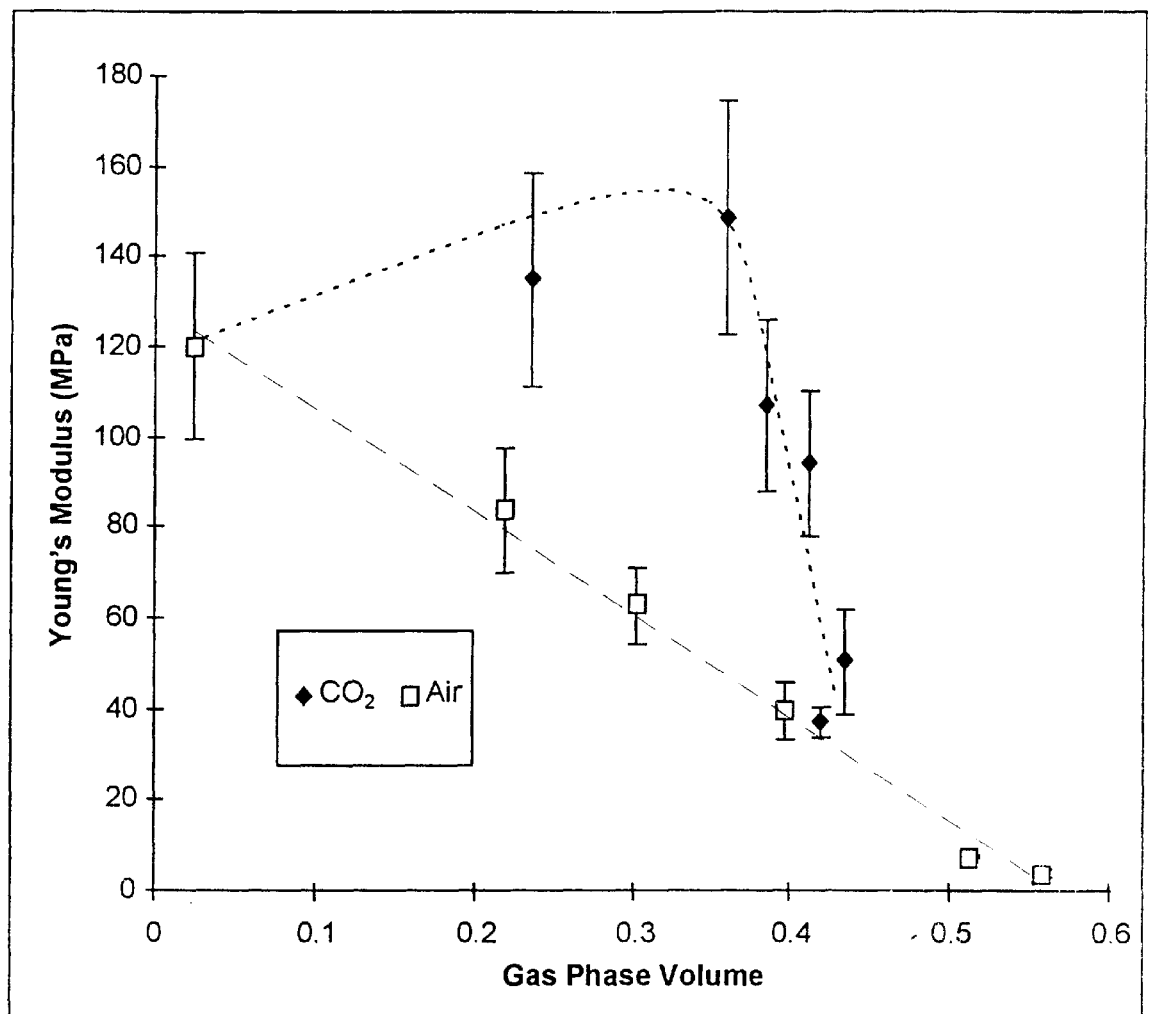

WATER ICE PRODUCT AND PROCESS OF MANUFACTURE

TECHNICAL FIELD OF THE INVENTION

The present invention relates to a water ice product and a process of its manufacture.

BACKGROUND TO THE INVENTION

There is an increasing need to be able to provide novel water ice products. In particular it is desirable to be able to provide products having a novel appearance and/or texture.

It is especially desirable to be able to provide a water ice that has a low calorific content and yet is of a relatively soft texture. Such a water ice has the advantage of being particularly refreshing.

However, if a low calorie containing water ice is manufactured in the conventional way a very hard block of ice is achieved which is not acceptable to the consumer when eaten at typical freezer temperatures.

Products which have been aerated by soluble gases such as carbon dioxide and/or nitrous oxide have been disclosed in the literature. Examples are U.S. Pat. No. 3,969,531 and JP 80017708.

U.S. Pat. No. 3,969,531 (Cornelius) discloses a process whereby a water and orange juice mixture is aerated with nitrous oxide gas to form a semi frozen comestible.

JP 80013708 discloses a granular frozen drink that may be drunk through a straw. A syrup is mixed with the water and carbon dioxide within a machine for manufacturing a frozen drink such that a carbon dioxide gas is located among the frozen material.

U.S. Pat. No. 4 826 656 describes a smooth textured soft frozen water ice with a solids content of 18–26% wt and an over-run of between 25–70% using air, where the water ice contains 0.05–0.5% wt of a stabilising mixture.

GB 915,389 describes a fat-free ice-cream containing dispersed air or gas so that it is easily cut or bitten when cold.

However we have found that such products have stability problems such that they cannot be further processed, for example they can be difficult to extrude, and also they are not storage stable at −18° C.

We have solved the above problems and are able to provide a stable water ice product having a channelled porous structure.

DISCLOSURE OF THE INVENTION

Accordingly the invention provides a water ice product which is stable to processing and storage at −18° C., said product having a channelled porous structure having a gas phase volume of between 0.1 and 0.45 after hardening, wherein the water ice product comprises a stabiliser and not less than 0.1 wt % of a protein-based aerating agent.

Preferably the product has a channelled porous structure having a gas phase volume of from 0.13 to 0.40 after hardening, preferably of from 0.2 to 0.35.

At gas phase volumes above 0.45 after hardening the channelled porous structure collapses or becomes less stable with increasing gas phase volume values. This structure collapse is undesirable as it does not provide the channelled porous structure of the present invention. Structure collapse may, in some formulations, begin to occur at gas phase volumes of 0.40 or higher. The water ice products having such collapsed structures are not within the ambit of the present invention. The gas phase volume of the water ice product is chosen to be within a gas phase volume range such that this structure collapse is substantially avoided.

By gas phase volume as used herein is meant the volume fraction of gas in the post hardened frozen product at −18° C.

By channelled porous structure is meant a structure containing voids in form of tortuous, non-spherical-channels wherein the channels are formed by the gas phase. Typically the channels are greater than 5 ice crystal diameters wide and can be, for example, up to 3 centimeters or more long and typically will be continuous throughout the structure. These channels have an aspect ratio in excess of 2.5 and can be of the order of 100 or more. In the case of channelling that is continuous throughout the structure the aspect ratio may be very much higher than 100.

These structures can therefore be distinguished from known aerated structures wherein the gas phase forms voids in the form of bubbles, the majority of which are substantially spherical in shape for a gas phase volume of between 0.1 and 0.45. These bubbles are typically smaller than approximately twice the diameter of the ice crystals surrounding them, down to 20% of the diameter of the crystals for a typical water ice frozen in an ice cream freezer. Furthermore, these bubbles typically have an aspect ratio of less than 2.5.

Aspect ratio is defined as the length of a void divided by the diameter. Structures are imaged using the technique described in "A low temperature scanning electron microscopy study of ice cream. I. Techniques and general microstructure" Food Structure Vol. 11 (1992), pp 1–9.

By water ice is meant a frozen solution made essentially from sugar, water, fruit acid or other acidifying agent, colour, fruit or fruit flavouring.

The water ice product of the present invention contains a stabiliser, preferably in an amount at least of 0.1 wt %. The maximum amount of stabiliser is about 1.0 wt %. Preferably the amount of stabiliser is in the range 0.1 wt % to 1.0 wt %, more preferably 0.15 wt % to 0.7 wt %, for example 0.2 wt % to 0.5 wt %. For a given formulation and/or processing conditions the exact amount of stabiliser required will depend on the type of the stabiliser used. Mixtures of stabilisers may also be used. The exact amount of a given stabiliser used will depend upon the effectiveness of said stabiliser. The amount of stabiliser refers to the total amount of stabiliser(s) in the product.

Conventional non-channelled, air aerated, water ices typically have a stabiliser content of from approximately 0.1 wt to 0.25 wt %. However, we have found that compared to the equivalent formulation in a commercial product having a non-channelled structure, in a product having the presently claimed channelled structure a higher stabiliser level is required in order to provide a stable water ice at a given gas phase volume.

As used herein the term "stabiliser" refers to compounds conventionally refered to in the art as stabilisers. They improve the stability of the water ice composition before freezing and act as thickening agents. It is believed that they increase the viscosity of the liquid phase before and during freezing.

Any stabiliser may be used, however Locust Bean Gum (LBG) is the preferred stabiliser. Other stabilisers that may be used include Agar-Agar, Algin-sodium alginate, propylene glycol alginate, Gum acacia, Guar seed gum, gum karaya, cat gum, gum tragacanth, carrageenan and salts thereof, furcellaran and salts thereof, psyllium seed husk and cellulose stabilisers. Mixtures of any of these stabilizers may be used.

The amount of protein based aerating agent in the product is not less than 0.1 wt %. The typical wt % range for the aerating agent in the composition is 0.1 wt % to 0.5 wt %, preferably 0.15 wt % to 0.4 wt %, more preferably 0.15 wt to 0.25 wt %.

An aerating agent, as the term is used herein, refers to any component which because of its surface activity and/or the viscosity it imparts, aids the formation of smaller gas cells (than would otherwise be formed) and resists their coalescence or separation in the unfrozen matrix.

Any protein based aerating agent may be used, for example egg based aerating agents such as egg white, sodium caseinate, soya isolate, wheat gluten and whey protein. Preferably the aerating agent is a hydrolysed milk protein such as Hyfoama (Trademark from Quest) and hydrolysed soya protein such as D-100 (trademark from Gunter Industries). The aerating agent is to be understood not to include aerating gases as referred to below.

The water ice product will typically have an ice content of from approximately 65% to approximately 95% by volume in the non-gaseous phase at −18° C., preferably from approximately 70% to approximately 92%, eg 75% to 90%.

The ice contents referred to herein are determined following the techniques described in the article by B de Cindio and S Correra in the Journal of Food Engineering, Volume 24, pages 405–415, 1995. The enthalpy data required for this technique is obtained using adiabatic calorimetry (Holometrix Adiabatic Calorimeter). The ice contents as expressed herein are measured on an 80 g sample poured into the sample holder of the calorimeter and cooled to −75° C. by placing the assembly in dry ice prior to placing in the calorimeter (precooled to between −70° C. and −80° C.). The enthalpy data obtained was analysed to give ice content as a function of the temperature following the method of Cindio and Carrera.

The channelled porous structure can be obtained using any typical water ice formulation. However it is a particular advantage of the invention that a water ice produced from a composition having a low total soluble solids, (approximately 5 wt % to 15 wt % total soluble solids preferably 5 wt % to 12 wt %) can be provided which has a novel texture and is particularly attractive to the consumer.

Typically the total soluble solids of the composition used to make water ice product of the present invention is in the range 5 wt % to 30 wt %, preferably 6 wt % to 25 wt % for example 7 wt % to 20 wt %.

The total soluble solids content is measured at 4° C. and is the wt % of the total composition that is dissolved at that temperature.

A further advantage of the products of the invention is that they are surprisingly provided with a surface which is substantially free from stickiness. Usually a non-sticky surface is obtained.

The product may be provided with a continuous or partial coating of, for example, a water glaze or a non-aerated water ice on at least one surface.

The present invention further provides an especially suitable method of preparation of water ices having the present stable channelled porous structure the method comprising steps (i) to (iii) below;
(i) aeration of a water ice composition with an aerating gas which contains at least about 50% by volume, preferably at least about 70% by volume, most preferably 100% by volume, of a water soluble gas.
(ii) freezing in a freezer, for example, an ice cream freezer, such that the residence time in the freezer is approximately 2.5 to 10 minutes, preferably 3 to 9 minutes, for example 3 to 8 minutes; and
(iii) two-stage hardening.

A water-soluble aerating gas is one with a solubility in water of at least 2 grams/100 g of water at 4° C. and 760 mmHg.

The water-soluble gas may be carbon dioxide, nitrous oxide and mixtures thereof. The remainder of the aerating gas will typically be nitrogen containing gas e.g. air. The composition of the aerating gas is chosen so as to form. The channelled porous structure at the required gas phase volume.

Aeration may occur within the (ice cream) freezer or alternatively before freezing, eg, within a pre-aerator before the water ice composition enters the (ice cream) freezer.

Preferably the water ice is aerated to provide a gas phase volume on extrusion from the ice-cream freezer of from 0.09 to 0.39, more preferably 0.12–0.31, eg 0.13–0.30. Preferably the aerating gas is carbon dioxide or a mixture of gases containing carbon dioxide.

It is to be understood that the aerating gas used according to the invention is not to be essentially air but must comprise a water-soluble gas as defined above.

Typically the ice cream freezer will be a scraped surface heat exchanger.

Conventional water ices are typically frozen in an ice cream freezer such that the residence time in the ice cream freezer is approximately 2 to 4 minutes. The longer residence time in the ice cream freezer in the process of the present invention described above is essential in order to provide the required stable channelled porous structure.

The resulting water ice may, and typically will, then be shaped e.g. by extrusion followed by cutting or moulding.

A two stage hardening step is required at step (iii) in order to achieve a stable channelled porous structure. It is particularly preferred that a two stage hardening step as defined below is used. The two stage hardening step may be achieved by rapid freezing in the first stage to partially form the structure of the ice product with the temperature of the second stage being suitable for expansion of the structure and the further development of the claimed stable channelled porous structure. The first stage hardening is preferably carried out using a colder temperature than the second stage. The first stage may use air at −20° C or below blown over the product. The hardening step could occur in a single freezer or in a first colder freezer with the second stage occurring in another freezer during storage. Without wishing to be bound by theory it is believed that the initial stage 'quick cool' hardening step provides structure stability to the final product.

A preferred two stage hardening step is;
(1) The temperature of the product needs to be reduced to below at least −20° C. within approximately 2 hours, for example within approximately 1 hour. This may be achieved by for example in a blast freezer, hardening tunnel, liquid nitrogen or any other suitable rapid cooling means. Typically the product is placed in a blast freezer for 1 hour at −35° C.; and
(2) The product is then retained at a temperature of approximately −18° C. or below until the product density stabilises. This may be effected by storing the product for 3 days in a cold store at −24° C. The structure is stabilised when there is no further change in its density.

During the two stage hardening process (step (iii)), the stable channelled porous structure develops. The overall hardening process results in an increase in the ice content of the water ice product. During the hardening process the increase in ice content results in a decrease in the solubility of the soluble gas used to aerate the water ice composition (step (i)), leading to increasing gas pressure in the partially hardened structure, forcing the opening up of channels of gas through the ice-matrix network.

A consequence of the two stage hardening process (step (iii)) is an increase in the gas phase volume achieved from ex-freezer. Preferably the water ice is aerated to provide a gas phase volume on extrusion from the ice cream freezer of from 0.12 to 0.31 which after hardening typically results in a gas phase volume from 0.13 to 0.40.

Mechanically, over the gas phase volume 0.1 to 0.45 preferably 0.1 to 0.40, the channelled porous structure gives a significantly higher Young's modulus value (higher stiffness) than air aerated structures where the gas phase consists of voids in the form of bubbles (for mechanical test see Example 1). In addition, these channelled porous structures provide water ices which are seen as more icy and crunchier than the air aerated structures of the prior art where the gas phase forms voids in the form of bubbles.

EXAMPLES

Example 1

Mechanical Properties

The test for Young's modulus requires production of a parallel sided rectangular bar of water ice material. This may be obtained by any suitable means.

In this particular example the parallel sided rectangular bar of water ice material was obtained by extruding from the ice cream freezer (scraped surface heat exchanger) into a pre-cooled metallic mould (having the dimensions 25×125× 210 mm) lined with silicon paper to prevent ice-metal adhesion, and then placement of the mould into a blast freezer at −35° C. The bars were removed after 2 hours, de-moulded and placed into a domestic freezer at −18° C. until testing (conducted after 4 days).

The test is described in "Biomechanics Materials. A practical Approach" Ed. J. F. V. Vincent, Pub. IRL Press, Oxford University Press, Walton Street, Oxford, 1992. Testing involves placing each bar onto 2 supports and bending it until fracture by applying pressure from a third support, centrally on the bar's top surface. The force applied in bending and the displacement of the moving contact are recorded throughout the test. The Young's modulus of the material is given by the equation;

$$E = \frac{(\Delta F/\Delta d)S^3}{4BD^3}$$

where E is the Young's modulus, $\Delta F/\Delta d$ is the gradient of the initially linear part of the Force vs. displacement curve and B and D are the breadth and depth of the bar respectively and S is the span between the two lower supports. For these tests, B=25 mm, D=25 mm and S=170 mm. The test was carried out with the test piece and test environment at −18° C., the speed of descent of the moving support was 50 mm per minute.

Example 2

A water ice solution having the following formulation was prepared as follows:

|  | % by weight |
|---|---|
| Sucrose | 20.00 |
| Citric acid | 0.50 |
| LBG | 0.50 |
| Aerating Agent | 0.20 |
| Flavour | 0.10 |
| Colouring | 0.02 |
| Water | to 100 |

The dry ingredients were thoroughly blended together before preparation of the water ice mix. The water was heated to 45–50° C. in a mixing tank which had a heating jacket and a high shear mixer. The dry ingredient blend was then gradually added to the water with the mixer running so as to thoroughly disperse and dissolve the soluble solids.

The mix was then further heated to 65° C. for approximately 10–15 minutes so that a homogenous mix solution was achieved.

The mix was then pastueurised at 85° C. for 15–20 seconds and then cooled to 5° C. and stored in a cold-jacketed stirred tank to maintain it at 5° C. before use.

The colours and flavours were then added at this stage to avoid their degradation.

The water ice solution was then dosed into a scraped surface heat exchanger (Freezer MF 75 made by Technology, Denmark with open dasher working at 410 rpm and a barrel pressure of 2.5 bar) at the rate of 0.5 liters per minutes for simultaneous aeration with 100% $CO_2$ and freezing. The $CO_2$ flow rate was varied to provide a water ice having a number of different gas phase volumes post ice cream freezer as shown in Table 1. The residence time in the ice cream freezer was 3 minutes. The water ice was extruded from the ice cream freezer at a temperature of −5° C. The water ice was then hardened in a blast freezer at −35° C. for 1 hour before transferring to a cold store at −25° C. for 3 days. Table 1 shows a comparison of the actual gas phase volume immediately from the ice cream freezer (i.e. on extrusion) with the gas phase volume achieved after hardening for 3 days.

TABLE 1

| $CO_2$ flow rate (liters min$^{-1}$) | Actual Gas Phase Volume Ex-freezer | Actual Gas Phase Volume Post-hardening |
|---|---|---|
| 0.10 | 0.130 | 0.237 |
| 0.20 | 0.200 | 0.359 |
| 0.40 | 0.310 | 0.383 |
| 0.50 | 0.335 | 0.412 |
| 0.60 | 0.394 | 0.435 |

It can be seen that the gas phase volume is increased ex-freezer. It is believed this is accompanied by an increase in the amount of channelling to provide the stable channelled porous structure.

Comparative Example A

Example 2 was repeated except that the water ice was aerated with air rather than $CO_2$.

Table 2 shows the different air flow rates used and the achieved gas phase volumes ex-freezer. It should be noted that with products aerated with air there is no expansion so the gas phase volume ex-freezer and the gas phase volume post-hardening will be identical.

The increase in the gas phase volume from ex-freezer to post-hardening is a characteristic feature of the products of the present invention.

TABLE 2

| Air flow rate (liters min$^{-1}$) | Actual Gas Phase Volume Ex-freezer |
|---|---|
| 0.10 | 0.130 |
| 0.14 | 0.200 |
| 0.26 | 0.310 |
| 0.28 | 0.335 |
| 0.33 | 0.394 |

BRIEF DESCRIPTION OF THE FIGURE

FIG. 1 represents the Young's Modulus versus the Gas Phase Volume of the water ice product.

FIG. 1 shows that mechanically, over the gas phase volume 0.24 to 0.44 post-hardening, the channelled porous structure as provided by Example 2(◆) gives a significantly higher (Up to 3 times greater) Young's modulus value (higher stiffness) than the air bubble structure provided in Comparative Example A(☐)

Example 3

A water ice solution having the following formulation was prepared as in Example 2, except the extrusion temperature from the ice cream freezer was −2° C. The $CO_2$ gas flow rate was 0.7 liters min$^{-1}$ providing a gas phase volume ex-freezer of 0.38 and a gas phase volume post-hardening of 0.44.

|  | % by weight |
|---|---|
| Fructose | 4.500 |
| Aspartame | 0.074 |
| LBG | 0.500 |
| Aerating agent | 0.200 |
| Citric acid | 0.500 |
| Flavour | 0.400 |
| Colouring | 0.020 |
| Water | to 100 |

A water ice having a channelled porous structure as according to the invention was produced.

What is claimed is:

1. A water ice product which is stable to processing and storage at −18° C., said product having a channelled porous structure having a gas phase volume of between 0.1 to 0.45 after hardening, wherein the water ice product comprises a stabiliser and not less than 0.1 wt % of a protein based aerating agent.

2. A water ice product according to claim 1 wherein the gas phase volume is between 0.13 and 0.40 after hardening.

3. A water ice product according to claim 1 wherein the product comprises the stabiliser in an amount of at least 0.1 wt %.

4. A water ice product according to claim 1 wherein the stabiliser is Locust Bean Gum.

5. A water ice product according to claim 1 wherein the aerating agent is present in an amount of 0.1 wt % to 0.5 wt % in the product.

6. A water ice product according to claim 1 wherein the protein-based aerating agent is a hydrolysed milk protein or a hydrolysed soya protein.

7. A water ice product according to claim 1 wherein the ice content of the non-gaseous phase of the water ice is within the range 65% to 95% by volume at −18° C.

8. A water ice product according to claim 1 wherein the product comprises the stabilizer in an amount of 0.1 wt % to 1.0 wt %.

9. A process for preparation of a water ice product of claim 1 comprising the steps;

(i) aeration of a water ice composition with an aerating gas which contains at least 50% by volume of a water soluble gas;

(ii) freezing in a freezer such that the residence time in the freezer is approximately 2.5 to 10 minutes; and (iii) two-stage hardening.

10. A process according to claim 9 wherein the aerating gas contains at least 70% by volume of a water-soluble gas, preferably 100% by volume.

11. A process according to claim 9 wherein two-stage hardening step occurs by:

(1) reducing the temperature of the product to below at least −20° C. within approximately 2 hours, followed by (2) retaining the product at a temperature of approximately −18° C. or below until the product density stabilises.

12. A process according to claim 9 wherein the residence time in the freezer is 3 to 9 minutes.

13. A process according to claim 9 wherein the aeration step (i) either occurs within the freezer or within a pre-aerator prior to the water ice composition entering the freezer.

14. A process according to claim 13 wherein the freezer is an ice-cream freezer.

15. A process according to claim 9 wherein the water soluble gas is selected from carbon dioxide, nitrous oxide and mixtures thereof.

16. A process according to claim 9 wherein the water ice has a gas phase volume of from 0.12 to 0.31 at extrusion from the freezer prior to hardening.

* * * * *